(12) United States Patent
Geula et al.

(10) Patent No.: US 11,813,995 B2
(45) Date of Patent: Nov. 14, 2023

(54) REDUNDANT POWER DISTRIBUTION SYSTEM BASED ON SINGLE POWER SOURCE

(71) Applicant: Ree Automotive Ltd., Kibbutz Glil-Yam (IL)

(72) Inventors: Gal Geula, Raanana (IL); Neta Doron, Tel-Aviv (IL)

(73) Assignee: Ree Automotive Ltd., Kibbutz Glil-Yam (IL)

( * ) Notice: Subject to any disclaimer, the term of this patent is extended or adjusted under 35 U.S.C. 154(b) by 0 days.

(21) Appl. No.: 17/990,713

(22) Filed: Nov. 20, 2022

(65) Prior Publication Data

US 2023/0294621 A1 Sep. 21, 2023

Related U.S. Application Data

(60) Provisional application No. 63/320,120, filed on Mar. 15, 2022.

(51) Int. Cl.
*B60R 16/023* (2006.01)
*H02J 9/06* (2006.01)
*H02J 7/00* (2006.01)
*B60R 16/033* (2006.01)
*H02J 7/34* (2006.01)

(52) U.S. Cl.
CPC ........ *B60R 16/0232* (2013.01); *B60R 16/033* (2013.01); *H02J 7/0013* (2013.01); *H02J 7/345* (2013.01); *H02J 9/061* (2013.01); *H02J 2207/20* (2020.01); *H02J 2207/50* (2020.01)

(58) Field of Classification Search
CPC .. B60R 16/0232; B60R 16/033; H02J 7/0013; H02J 7/345; H02J 9/061; H02J 2207/20; H02J 2207/50

USPC ........................................................ 307/10.1
See application file for complete search history.

(56) References Cited

U.S. PATENT DOCUMENTS

| | | | |
|---|---|---|---|
| 9,899,834 B1 * | 2/2018 | Mayo | H02J 1/082 |
| 2006/0145538 A1 * | 7/2006 | Proefrock | H02J 7/0019 307/18 |
| 2018/0029474 A1 | 2/2018 | Berels et al. | |

(Continued)

OTHER PUBLICATIONS

International Search Report dated Jun. 5, 2023 in corresponding PCT Application No. PCT/IB2023/052475.

*Primary Examiner* — Michael R. Fin
(74) *Attorney, Agent, or Firm* — Harness, Dickey & Pierce, P.L.C.

(57) ABSTRACT

An electrical power distribution system includes a first power bus operating in a first voltage range and a second power bus operating in the first voltage range. A first eFuse circuit selectively couples a power source to the first power bus. A second eFuse circuit selectively couples the power source to the second power bus. A first accumulator is coupled to a first node between the first eFuse circuit and the first power bus. A second accumulator is electrically coupled to a second node between the second eFuse circuit and the second power bus. The first eFuse circuit opens in response to a first electrical fault at the first power bus, and the second power bus is powered with the power source or the first accumulator. The second eFuse circuit opens in response to a second electrical fault at the second power bus, and the first power bus is powered with the power source or the first accumulator.

42 Claims, 6 Drawing Sheets

(56) References Cited

U.S. PATENT DOCUMENTS

| | | | |
|---|---|---|---|
| 2018/0354436 A1* | 12/2018 | Sato | ......................... H02H 7/18 |
| 2019/0135206 A1 | 5/2019 | Sturza et al. | |
| 2021/0276425 A1 | 9/2021 | Gauthier et al. | |
| 2021/0284262 A1 | 9/2021 | Sardes et al. | |
| 2022/0102966 A1* | 3/2022 | Tan | ...................... G01R 31/006 |

* cited by examiner

REDUNDANT POWER DISTRIBUTION SYSTEM BASED ON SINGLE POWER SOURCE

CROSS-REFERENCE TO RELATED APPLICATION

This application claims the benefit of U.S. Provisional Application No. 63/320,120, filed on Mar. 15, 2022. The entire disclosure of the above application is incorporated herein by reference.

TECHNICAL FIELD

The present disclosure relates to power distribution systems, and more particularly, to a redundant power distribution system based on a single power source and multiple buses.

BACKGROUND

In automotive vehicles, 12-volt or 48-volt electrical systems are commonly used to power various components. The 12-volt or 48-volt system is referred to as a low-voltage power system. More recently, different power systems are being used in vehicles. For example, 48-volt systems are increasing in popularity. In electrical vehicles, a high-power electrical source, such as a high voltage battery, is commonly provided. High voltage batteries may operate with significantly higher voltages such as 400 volts.

Many components in vehicles still operate using 12 or 48-volt volts even in vehicles with higher power sources. The high voltage source provides the high voltage power to a power converter which, in turn, converts the high voltage power to low voltage, such as 12 volts or 48-volt, for use in a bus. Using multiple consumers on high voltage bus and as well on low voltage systems in a vehicle increases the potential for and types of electrical faults. If any of the electrical components coupled to the power bus has an electrical fault, other components coupled to the power bus may be affected. Short circuits to ground or to a higher voltage source (overvoltage), and overcurrent are examples of an electrical fault. Electrical faults may prevent the vehicle from operating in a desired manner and may allow for the possibility of damage to the electrical components. For example, decreased voltage may prevent certain electrical devices from operating properly. For example, certain devices may require a minimum voltage to operate. Operating a vehicle without expected components may affect the operation and safety of the vehicle

SUMMARY

The statements in this section merely provide background information related to the present disclosure and may not constitute prior art.

The present disclosure provides a redundant power distribution system that includes two buses and one power source, such as a DC-to-DC converter, that is used to power both buses.

In one aspect of the disclosure, a system for an automotive vehicle includes a first power bus operating in a first voltage range and a second power bus operating in the first voltage range. A first eFuse circuit selectively couples a power source to the first power bus. A second eFuse circuit selectively couples the power source to the second power bus. A first accumulator is coupled to a first node between the first eFuse circuit and the first power bus. A second accumulator is electrically coupled to a second node between the second eFuse circuit and the second power bus. The first eFuse circuit opens in response to a first electrical fault at the first power bus, and the second power bus is powered with the power source or the first accumulator. The second eFuse circuit opens in response to a second electrical fault at the second power bus, and the first power bus is powered with the power source or the first accumulator.

Other examples of the electrical power distribution system include: the first eFuse circuit opens by disconnecting the power source from the first power bus and the second eFuse circuit opens by disconnecting the power source from the second power bus; the first power bus being powered by the first accumulator and the second power bus powered by the second accumulator during a failure of the power source and the first eFuse circuit and the second eFuse circuit being open during the failure of the power source; a first relay electrically coupled to the first node between the first eFuse circuit and the first power bus, and a second relay electrically coupled to the second node between the second eFuse circuit and the second power bus; the first relay opens in response to the first electrical fault at the first power bus, and the second relay opens in response to the second electrical fault at the second power bus; a relay controller controlling the relay in response to a fault detection circuit; the relay controller closes the first relay or the second relay when the first electrical fault or the second electrical fault subsides; the power source comprising a DC-to-DC converter; the first accumulator comprises a first battery or a first ultracapacitor and the second accumulator comprises a second battery or a second ultracapacitor; a steering controller is electrically coupled to the first power bus or the second power bus, or both; the first power bus is coupled to a first plurality of components and the second power bus is coupled to a second plurality of components, said first plurality of components greater than the second plurality of components.

Other aspects of the disclosure include an automotive vehicle that comprises the electrical power distribution system described above. Other aspects of automotive vehicle include: a plurality of vehicle corner modules coupled to the first power bus and the second power bus; the first power bus is coupled to a steering controller of each of the plurality of vehicle corner modules having a steering system and the second power bus is coupled to the steering controller of each of the plurality of vehicle corner modules having the steering system; and, the first power bus is coupled to a front left brake controller and a rear right brake controller, and the second power bus is coupled to a front right brake controller and a rear left brake controller.

In another aspect of the disclosure, a method comprises operating a first power bus in a first voltage range, operating a second power bus in the first voltage range, selectively coupling a power source to the first power bus through a first eFuse circuit, selectively coupling the power source to the second power bus through a second eFuse circuit, electrically coupling a first accumulator to a first node between the first eFuse circuit and the first power bus, electrically coupling a second accumulator to a second node between the second eFuse circuit and the second power bus, opening the first eFuse circuit in response to a first electrical fault at the first power bus, and powering the second power bus with the power source or the first accumulator and opening the second eFuse circuit in response to a second electrical fault at the second power bus, and powering the first power bus with the power source or the first accumulator.

Other aspects of the method include: opening the first eFuse circuit comprises disconnecting the power source from the first power bus and wherein opening the second eFuse circuit comprises disconnecting the power source from the second power bus; powering the first power bus by the first accumulator and powering the second power bus by the second accumulator during a failure of the power source and opening the first eFuse circuit and the second eFuse circuit during the failure of the power source; electrically coupling a first relay to the first node between the first eFuse circuit and the first power bus, and further comprising electrically coupling a second relay to the second node between the second eFuse circuit and the second power bus; opening the first relay in response to the first electrical fault at the first power bus and opening the second relay in response to the second electrical fault at the second power bus; controlling the first relay in response to a fault detection circuit with a relay controller; closing the first relay or the second relay when the first electrical fault or the second electrical fault subsides using the relay controller; the power source comprises a DC-to-DC converter, the first accumulator comprises a first battery or a first ultracapacitor and wherein the second accumulator comprises a second battery or a second ultracapacitor; electrically coupling a steering controller to the first power bus; electrically coupling the first power bus to a front left brake controller and a rear right brake controller and electrically coupling the second power bus to a front right brake controller and a rear left brake controller; coupling the first power bus to a first plurality of components and coupling the second power bus to a second plurality of components, said first plurality of components greater than the second plurality of component; coupling a plurality of vehicle corner modules to the first power bus and the second power bus; coupling the first power bus to a front left brake controller and a rear right brake controller, and coupling the second power bus to a front right brake controller and a rear left brake controller; coupling the first power bus to a front left brake controller and a rear right brake controller, and coupling the second power bus to a front right brake controller and a rear left brake controller; and, coupling the first power bus to a steering controller of each of the plurality of vehicle corner modules having a steering system and coupling the second power bus to the steering controller of each of the plurality of vehicle corner modules having the steering system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

Figure 1:
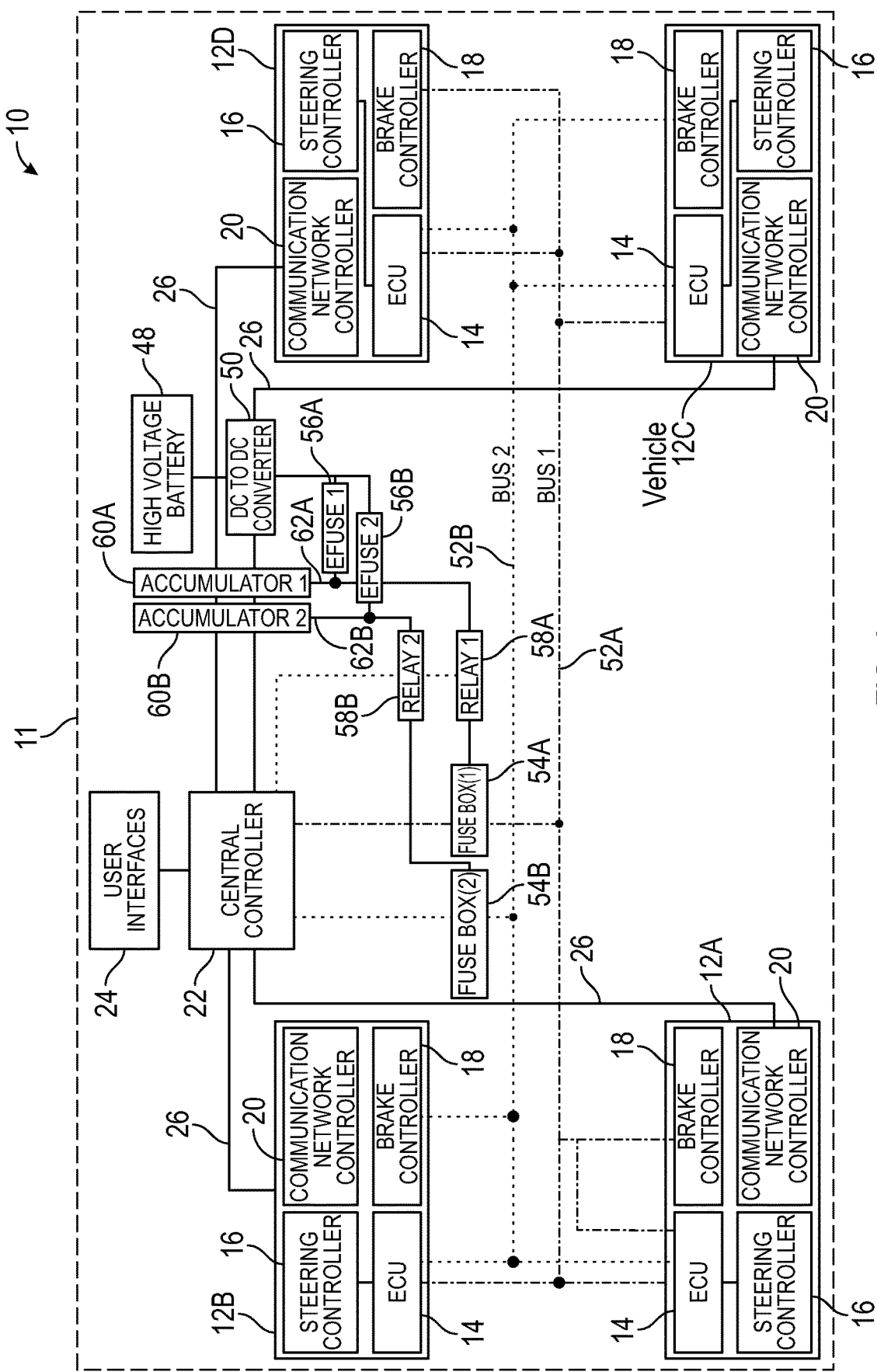
FIG. 1 is a high-level block diagrammatic view of a vehicle having the redundant power distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

More specifically, some embodiments relate to operation of a vehicle comprising a plurality of vehicle corner modules. Unless otherwise indicated, a "vehicle corner module" or "VCM" as used herein means an assembly for supporting a wheel of a vehicle and regulating the motion of a vehicle according to any of the embodiments disclosed herein. The VCM assembly includes components such as (and not exhaustively): steering systems, suspension systems, braking systems including hydraulic sub-systems, gearing assemblies, drive motors, driveshafts, wheel hub assemblies, controllers, communications arrangements, and electrical wiring. In some embodiments, a VCM can include a wheel and tire. A VCM can be mounted to a 'reference frame' of a vehicle, e.g., a chassis or similar vehicle frame or a platform, although the mounting need not necessarily be done 'as a unit'. When a VCM is described as being installed in/on a vehicle, then the VCM is mounted to the reference frame. A VCM may include a 'sub-frame' to which some or all of the VCM components are mounted or otherwise attached such that the sub-frame mediates between the reference frame and the various VCM components. The term 'sub-frame' should be understood to mean any rigid frame or one or more structural elements in fixed combination. The 'sub' prefix is intended to distinguish the sub-frame from a main frame or reference frame of the vehicle. A VCM may or may not include one or more electric motors and/or the wheel itself (and tire).

When used in this specification and in the claims appended hereto, the word "vehicle" is to be understood as referring to a motorized vehicle having one or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which VCMs can be mounted) and one or more wheels. A 'vehicle platform' need not necessarily comprise, at the time of providing the vehicle platform, all the accoutrements required for transport of passengers and/or cargo such as vehicle-body components or interior furnishings.

As disclosed hereinbelow, operation of a vehicle, including regulating the actuation of one or more sub-systems performing operational functions, can be controlled and/or managed by one or more VCM-controllers. A VCM-controller is a controller installed onboard a VCM and programmed to regulate the actuation of at least one of the functional sub-systems at least in its own VCM. Some VCM-controllers are programmed, i.e., have access to program instructions executable by one or more processors of the VCM-controller, to regulate the actuation of a plurality of functional sub-systems in the VCM or of all the functional sub-systems in the VCM. As will be further described, in some embodiments of the invention, a VCM-controller can be additionally programmed to regulate the actuation of at least one of the functional sub-systems of one or more other VCMs. In embodiments, a VCM-controller can be additionally programmed to regulate the actuation of a plurality of functional sub-systems in the one or more other VCM or of all the functional sub-systems in the one or more other VCMs.

The expression 'regulate actuation' as used herein means to perform a control function that includes, but not exhaustively: activation, cessation, modulation, and management of a physical and/or electrical and/or electronic function. Regulating actuation can also include monitoring the operation and/or performance of a functional sub-system and actively performing or changing a control function in response to information received in the monitoring. Regulating actuation can also include any or all of: conducting test procedures on the regulated or controlled sub-systems, collecting operational and maintenance data on the regulated or controlled sub-systems, and maintaining and communicating status information of the regulated or controlled sub-systems.

The term "controller" as used herein means a computing device configured for monitoring, controlling, regulating and/or actuating one or more components, systems or sub-systems. A controller should be understood to include any or all (and not exhaustively): one or more processors, one or more computer-readable media, e.g., transient and/or non-transient storage media, e.g., media containing program instructions for execution by the one or processors, communications arrangements, one or more power sources and/or a connection to a power source, and firmware and/or software. When used herein in a hyphenated expression such as vehicle-controller or VCM-controller, the term means a controller for controlling the vehicle and/or components and/or sub-systems of the vehicle, or a controller for controlling the VCM and/or components and/or sub-systems of the VCM, respectively. Unless specifically noted otherwise, a controller is installed in or on the controlled element (vehicle, VCM, etc.). For example, a VCM-controller is located in or on the VCM which is the primary VCM for control by that VCM-controller. Controllers (and control units) can be programmed in advance, e.g., by having program instructions stored in the computer-readable media for execution by one of more processors of the controller. Thus, a controller 'configured' to perform a function is equivalent herein to the controller being programmed, i.e., having access to stored program instructions for execution, to perform said function. A VCM-controller, according to embodiments, can regulate actuation of a function, e.g., a function performed by a mechanical and/or electrical sub-system of a VCM; such regulation can be of the function in a VCM-controller's 'own respective VCM' or in any other VCM (or VCMs) with which the VCM-controller is in electronic communication; such electronic communication can be with a VCM-controller of the other VCM or VCMs and/or with any systems or sub-systems of the other VCM or VCMs. Regulating actuation of a function (or, equivalently, of a sub-system configured to perform such a function) can include the entire range of operations related to the function. In a non-limiting example, a drive function performed by a drive sub-system can include starting, accelerating, speed-keeping, slowing (e.g., using the engine mass or in concert with another sub-system such as, for example, a braking sub-system), and stopping. A VCM-controller can include multiple control modules, for example control modules that are programmed to control specific functions such braking, steering, etc.

In some embodiments, a vehicle may be fully controlled through all aspects of the vehicle operation where all computing work is carried out by one or more of the computing units of the VCMs, i.e., the VCM-controllers. A VCM may be in active communication not only with the vehicle platform but also, or alternatively, with at least one other VCM. VCMs of a vehicle may be all of the same type, or may differ having same type at the front and having another type at the rear of the vehicle. In some other examples VCMs of one side may be of the same type and VCMs of the other side may be of a different type. For example, in a specific type of vehicle the front VCMs may be steerable and motorized while the rear VCMs may lack steering and/or motorizing capabilities. In another example, the VCMs may differ from each other by the sensors they are equipped with. In such embodiments VCMs that have more sensors may communicate relevant data to other VCMs lacking these sensors. In another example, the VCMs may differ from each other by having different performance profiles (e.g. size, response, power).

The terms "communications arrangements" or similar terms such as "communications schemes" as used herein mean any wired connection or wireless connection via which data communications can take place. Non-limiting and non-exhaustive examples of suitable technologies for providing communications arrangements include any short-range point-to-point communication system such as IrDA, RFID (Radio Frequency Identification), TransferJet, Wireless USB, DSRC (Dedicated Short Range Communications), or Near Field Communication; wireless networks (including sensor networks) such as: ZigBee, EnOcean; Wi-fi, Bluetooth, TransferJet, or Ultra-wideband; and wired communications bus technologies such a CAN bus (Controller Area Network, Fieldbus, FireWire, HyperTransport and InfiniBand. "Establishing a communications link" as used herein means initiating and/or maintaining data communications between two or more processing units (e.g., controllers, computers, processors, etc.) in accordance with any of the communications protocols supported by the two or more communicating nodes.

As used throughout this disclosure and the claims appended hereto, the term "electrical signals" or similar terms such as "electrical inputs" means electrical and/or electronic, and includes any transmission of either direct or alternating electric current, of electronic information, or of any combination of electrical and electronic signals and information. As used throughout this disclosure and the claims appended hereto, the term "signals" without a modifier (such as, e.g., "electrical") means electrical, electronic and/or optically-transmitted signals but does not include mechanically transmitted 'signals', e.g., instructions. Examples of electrical signals included in the definition of 'signals' include any one or any combination of voltage, current, power, resistance and capacitance transferred or propagated so as to reach a VCM (including, in some examples, VCM-controller. By their nature, electrical signals (excluding electronic signals) are transferred over physical connections. Examples of electronic signals include any type or format of data communication transmitted over wire or wirelessly, and can include, and not exhaustively: specific or implicit instructions for actuation, regulation or cessation of operation of a VCM system or sub-system; sensor data and/or status, alarm/fault indications including fault-condition statuses and instructions; periodic, scheduled, and/or special status requests and messages; test messages; and diagnostic requests and results. Examples of optically-transmitted signals include, without limitation, the foregoing examples of electronic signals, although transmitted at least in part over optical communications infrastructure.

A "control system" as the term is used herein means a networked system that includes coordinated and/or networked plurality of controllers. In one example, a control system can include a network of VCM-controllers that comprises all of the VCM-controllers of a vehicle. In another example, the control system can additionally include a vehicle-controller. In other examples, the control system can additionally include other controllers such as, for example, a power management system, a battery management system, or a thermal management system. An autonomy computer can be present and in data communication with the control system.

Each general-purpose computing device may be implemented electronically in analog circuitry, digital circuitry or combinations thereof. Further, the computing device may include a microprocessor or microcontroller that is programmed to perform instructions to carry out the steps performed by the various system components.

The present system allows one power source such as a power converter to supply power to two buses in parallel. In the event of an electrical failure such a failure of the power source, redundancy prevents both buses from being unpowered simultaneously. The system allows disconnection of a bus within nanoseconds to prevent damage to the power source and allow continued operation of the unaffected bus.

Referring now to FIG. 1, a vehicle having a vehicle chassis, frame, or platform 11 is illustrated. The automotive vehicle 10 in this example is an electric vehicle. However, the present disclosure applies to various types of vehicles including hybrid vehicles and vehicles with an international combustion engine.

The vehicle 10 has plurality of vehicle corner modules 12A, 12B, 12C and 12D. In this example, vehicle corner module 12A corresponds to the front left position of the vehicle 10, vehicle corner module 12B corresponds to the front right position, vehicle corner module 12C corresponds to the rear left position and vehicle corner module 12D corresponds to the rear right position. In the present example, the components of the vehicle corner modules 12A-12D may be configured identically. However, the components within each vehicle corner modules 12A-12D, for example brake system, steering system, drive system, active suspension system, and thermal system, may also vary based upon the position in the vehicle.

The vehicle corner modules 12A-12D may include various sensor motors, controllers and actuators. In the present example, only relevant components are illustrated. In this example, an electronic control unit 14 that is coupled to a steering controller 16 such a steering inverter is used to turn the wheels at each of the corners. A brake controller 18 is used to control the actuation of the brakes at each corner. The brake controller 18 may be coupled to a solenoid that is used to pressurized brake fluid at each of the corner modules 12A-12D. A communication network controller 20, disposed at each corner, is used to communicate to and from a central controller 22. The central controller 22 may receive various inputs from various user interfaces 24, such as a brake pedal, a hand wheel, switches, dials, touch screens and buttons. The central controller 22 coordinates the communication between the vehicle corner modules 12A-12D and more specifically, the communication network controllers 20 through a controller area network 26.

Power is provided to the vehicle by a high voltage battery 48. In one example, the high voltage battery is 400 volts. A power source such as a DC-to-DC power converter 50 converts the high voltage from the high voltage battery 48 to a lower voltage such as 12 volts or 48 volts as used in the present example. Ultimately, the voltage from the DC-to-DC converter is communicated in parallel to a first power bus 52A and a second power bus 52B. The buses 52A and 52B may be referred to as electrical distribution buses. The first power bus 52A and the second power bus 52B operate at the same voltage range for example, around 12 volts or around 48 volts. Fuse boxes 54A, 54B are electrically coupled to the respective buses 52A, 52B. The fuse boxes 54A, 54B are also electrically coupled to the central controller 22.

A first eFuse circuit 56A (or simply eFuse) selectively couples power from the DC-to-DC power converter 50 to an optional relay 58A. Likewise, a second eFuse circuit 56B selectively couples power from the DC-to-DC converter 50 to an optional relay 58B. The use of the two eFuses 56A, 56B in parallel may be referred to as an OR-ring circuit that is unidirectional. Unidirectional means power is provided in one direction from a single source and the buses are not interconnected when one bus fails. The relays 58A, 58B are latch relays that hold their last state if power is removed. The relays 58A, 58B are optional but are useful when isolation of power during external charging is desirable, as described in more detail below. The relays 58A, 58B are coupled to the fuse boxes 54A, 54B, respectively. Ultimately, the relays 58A, 58B are controlled by the central controller 22 as will be described in further detail below. A first accumulator 60A and a second accumulator 60B are coupled to the relays 58A, 58B or directly to the fuse boxes 54A, 54B should relays not be used. The accumulators 60A, 60B, the eFuses 56A, 56B and the relays 58A, 58B or the fuse boxes 54A, 54B from respective common nodes 62A, 62B. The accumulators 60A, 60B may be a low voltage battery such as a 12 volt battery or another type of energy storage device such as an ultracapacitor. The term high voltage and low voltage are terms that are relative to each other, high voltage is greater than the low voltage. Details of the eFuses 56A, 56B are set forth below. Ultimately, the eFuses 56A, 56B may open in response to electrical faults at the first power bus 52A and the second power bus 52B, respectively. The accumulators 60A, 60B may also be used to power the buses 52A, 52B as described in further detail below.

Figure 2A:
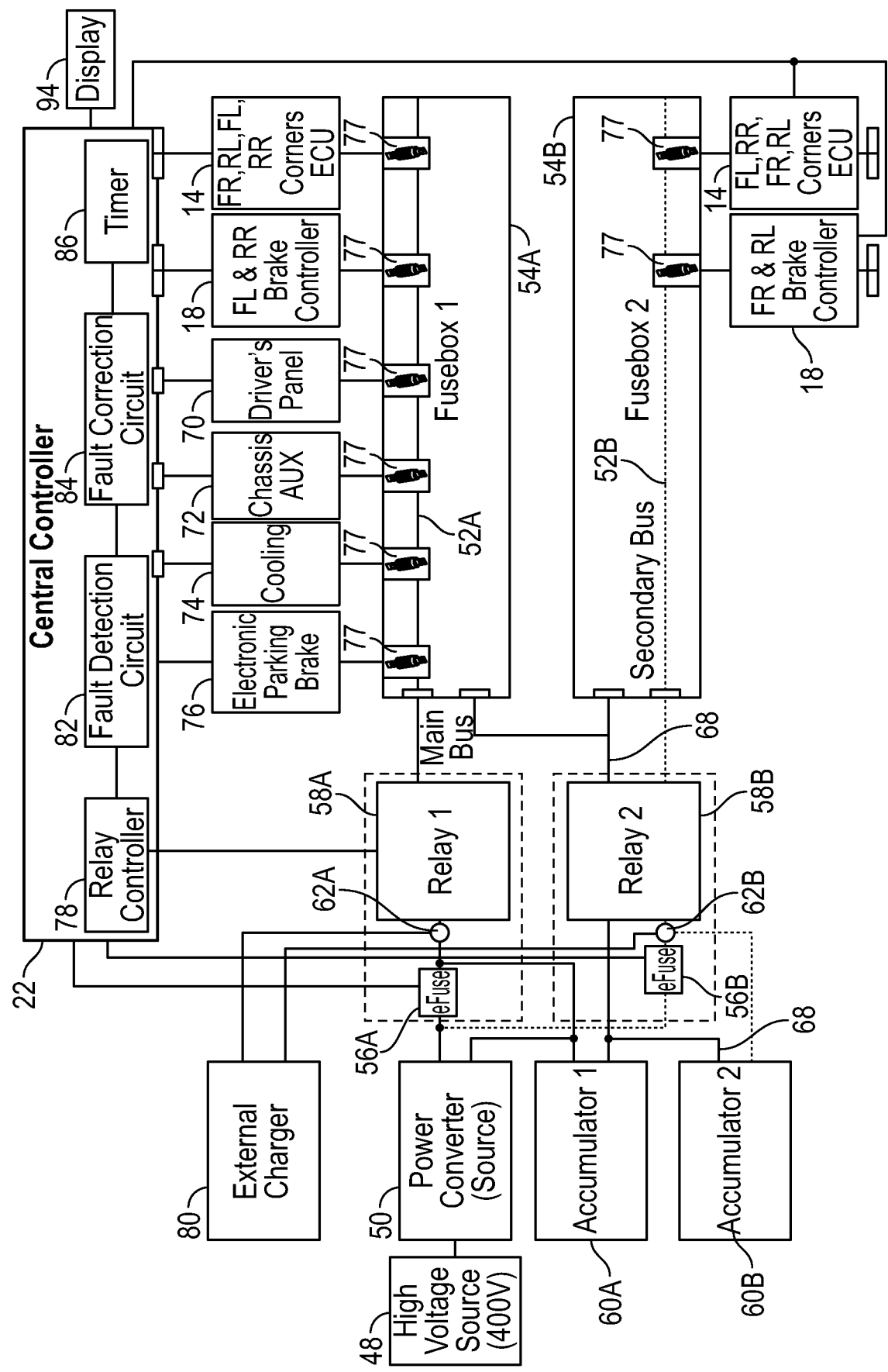
FIG. 2A is a detailed block diagrammatic view of a first example of the redundant power distribution circuit of FIG. 1.

Referring now to FIG. 2A, further details of a first example of an electrical system are illustrated in further detail below. Details of the fuse boxes 54A, 54B and the buses 52A, 52B coupled thereto are set forth. In this example, various electrical devices are coupled between the fuse boxes 54A, 54B and the central controller 22. In this example, the brake controllers 18 for the vehicle corner modules 12A and 12D are electrically coupled to the first power bus 52A. The brake controllers 18 for the front right vehicle corner module 12B and 12C are coupled to the second power bus 52B. The ECUs 14 that are used to control the steering controller 16 are coupled to both the first power bus 52A and the second power bus 52B. Other components such a driver panel 70, a chassis auxiliary module 72, a cooling module 74 and an electronic parking brake 76 are coupled to the first power bus 52A. Fuses 77 may be electrically coupled the components to their respective busses. Because of the relatively slow speed of a fuse, the fuses 77 are not relied upon for fast acting electrical protection. Ground connection 68 between the fuse boxes 54A, 54B, the relays 58A, 58B, the power converter 50 and the accumulators 60A, 60B is illustrated.

The central controller 22 may also comprises a relay controller 78 that is used to control the opening and closing of the relays 58A, 58B. The relay controller 78, for example, may control the relays 58A, 58B in response to an ignition signal in an ignition start-up sequence. The start-up sequence will be described in further detail below. The relays 58A and 58B allow the buses 52A, 52B to be decoupled or electrically isolate nodes 62A, 62B. The external charger 80 is coupled to the nodes 62A, 62B when the vehicle is at rest (parked). The external charger 80 is used to charge the accumulators 60A, 60B.

The central controller 22 may also comprise a fault detection circuit 82 and a fault correction controller 84. The fault detection circuit 82 may monitor or receive signals from the modules/controllers 14, 18 and 70-66. The signals may include fault codes, currents, voltages such as over voltage or under voltage, pulse counts and the like. The signals may indicate or correspond to a faut condition. When a fault is detected at the fault detection circuit 82, the relay controller 78 is commanded to open either or both relays 58A, 58B. The eFuses 56A and 56B open immediately (milliseconds before the relays 58A, 58B respond). The fault correction controller 84 also receives the fault detection signal and may command shutting down of the faulting module or control the module to correct or attempt to correct the fault. The timer 86 may be used as a guide between shutting down of a fault and the resetting of the module detected to be in fault. That is, a predetermined time may be waited until an attempt to reconnect. If a module cannot be operated properly (the fault cannot be corrected), the faulting module may be eliminated from operating so it does not affect the associated bus 52. Thereafter, the fault detection circuit 82 may command one or both relays 58A, 58 to close allowing the entire system to operate without the faulting module. The vehicle operator may be warned with a warning signal (audible, visual, or haptic) communicated to the display 94 from the fault correction controller 84.

Figure 2B:
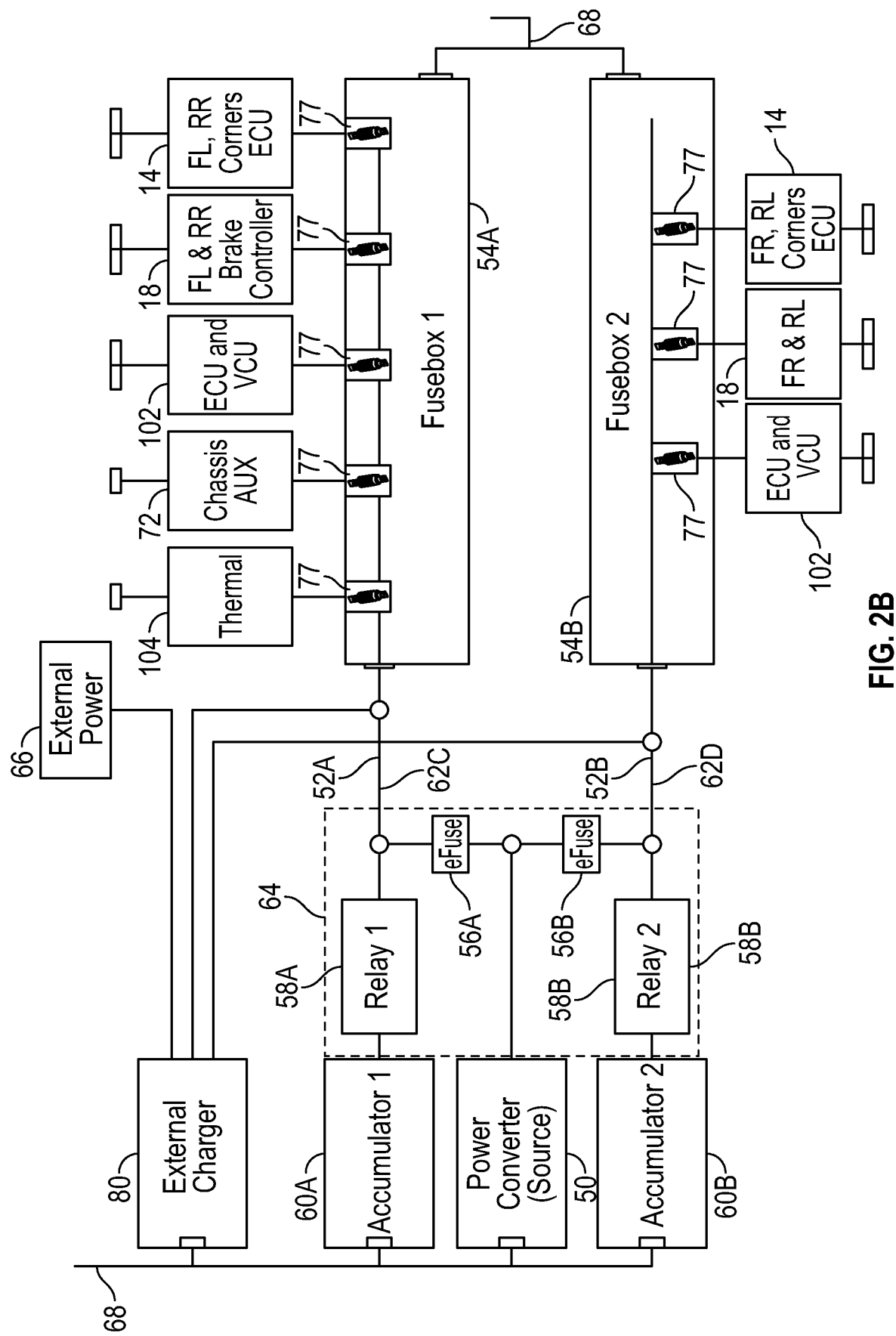
FIG. 2B is a detailed block diagrammatic view of a second example of the redundant power distribution circuit of FIG. 1.

Referring now to FIG. 2B, a second example of an electrical system are illustrated. In this example, may of the components are the same and therefore only the differences will be described. In the second example, the external charger 80, the output of the relay 58A and the eFuse 56A have a common node 62C. Node 56C also includes the bus 52A. The external charger 80, the output of the relay 58B and the eFuse 56B have a common node 62D. Node 56D also includes the bus 52B.

The relays 58A, 58B, the eFuses 56A, 56B may be included a single circuit board 64. The circuit board 64 may be easily manufactured for location within the vehicle 10. The relays 58A, 58B may also be part of the accumulators 60A, 60B.

Further differences include an external power source 66 is also shown coupled tot the external charger 80. The external power source 66 may also be used in FIG. 2A.

Additional modules include an ECU (Electric control unit)/VCU (Vehicle control unit) module 102 and a thermal module 104 that are coupled to the bus 52A. The ECU/VCU 102 may also be coupled to the bus 52B. A thermal module 104 may also be coupled to the bus 52A.

Although the central controller 22 and its components from FIG. 2A are not illustrated in FIG. 2B, the central controller 22 may also be used in FIG. 2B. The relay controller 78 also is used to control the opening and closing of the relays 58A, 58B. The relay controller 78, for example, may control the relays 58A, 58B in response to an ignition signal in the ignition start-up sequence. The relays 58A and 58B allow the buses 52A, 52B to be decoupled or electrically isolated from accumulators 60A, 60B. However, the external charger 80 remain coupled to the nodes 62C, 62D when the vehicle is at rest (parked). The external charger 80 is used to charge the accumulators 60A, 60B when the vehicle is at rest. The relays 58A and 58B may therefore be closed when the vehicle is at rest. When a fault is detected at the fault detection circuit 82, the relay controller 78 is commanded to open either or both relays 58A, 58B. The eFuses 56A and 56B may open immediately (milliseconds before the relays 58A, 58B respond). As stated above, the fault correction controller 84 also receives the fault detection signal and may command shutting down of the faulting module or control the module to correct or attempt to correct the fault.

Figure 3:
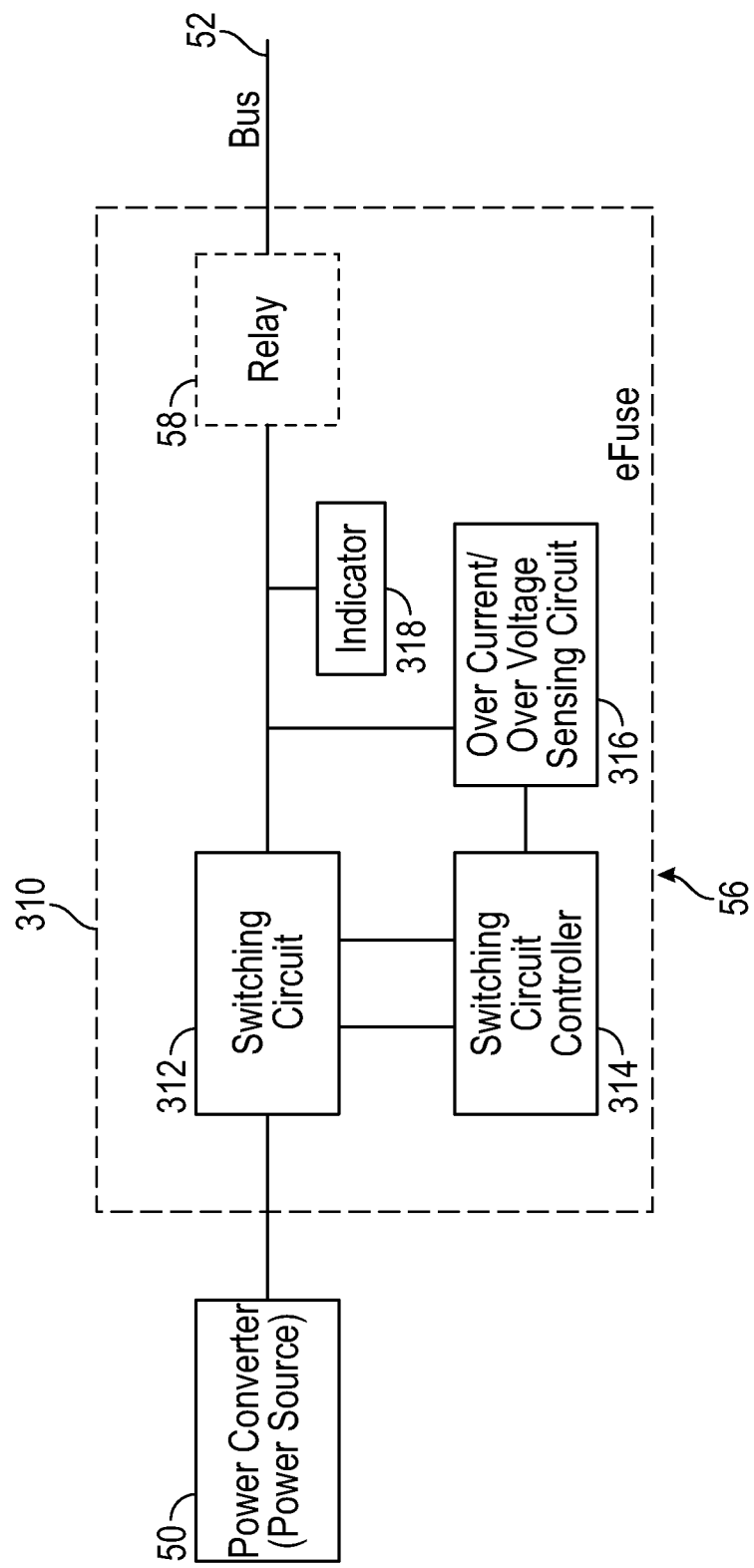
FIG. 3 is a block diagrammatic view of an eFuse used in FIGS. 1, 2A and 2B.

Referring now to FIG. 3, an eFuse circuit 56 is illustrated in further detail. The term eFuse 56 may be used collectively for the eFuse 56A and the eFuse 56B. The eFuse 56 may be disposed on a circuit substrate 310. The circuit substrate 310 may include a switching circuit 312. As will be described in further detail below, the switching circuit 312 may include n-channel MOSFETs that are ultimately used to connect and disconnect the power converter 50 from its associated bus 52. The relay 58, as mentioned above, is an optional feature and may be optionally coupled to the circuit substrate 310. The bus 52 communicates electrical faults through the relay 58 and to the switching circuit 312. A switch circuit control 314 and an overcurrent/overvoltage sensing circuit 316 are ultimately coupled to the switching circuit 312. The overcurrent and overvoltage sensing circuit 316 may provide a control signal to the switching control 314 to allow the switching circuit 312 to switch to an open position. The use of a n-channel MOSFETs allows the switching circuit 312 to open rapidly within nanoseconds and prevent damage to the power converter 50. The switching circuit 312 may detect a short circuit while the overcurrent/sensing circuit 316 may detect overcurrent and overvoltage. An indicator 318 may be used to indicate a fault with the circuit.

Figure 4:
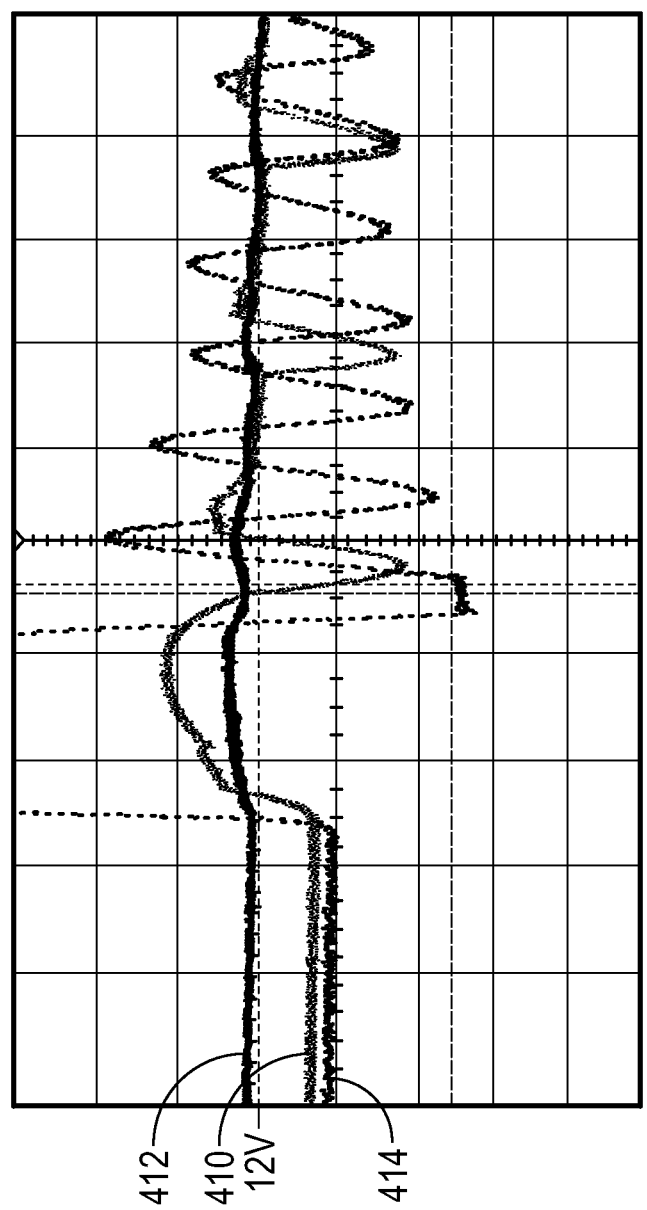
FIG. 4 is a signal diagram of the operation of the first power bus, the second power bus and a short circuit to 48 volts condition.

Referring now also to FIG. 4, the voltage on the main bus 52A is illustrated as signal 410. The protective bus or secondary bus 52B has a signal 412. In this example, the output to the eFuse at node 62A is represented by the signal 414. The node 62A is shorted to ground which causes the eFuse 56A to open. As can be seen, the effect of the output from the power converter 50 on the voltage at the secondary bus 52B is minimal.

Figure 5:
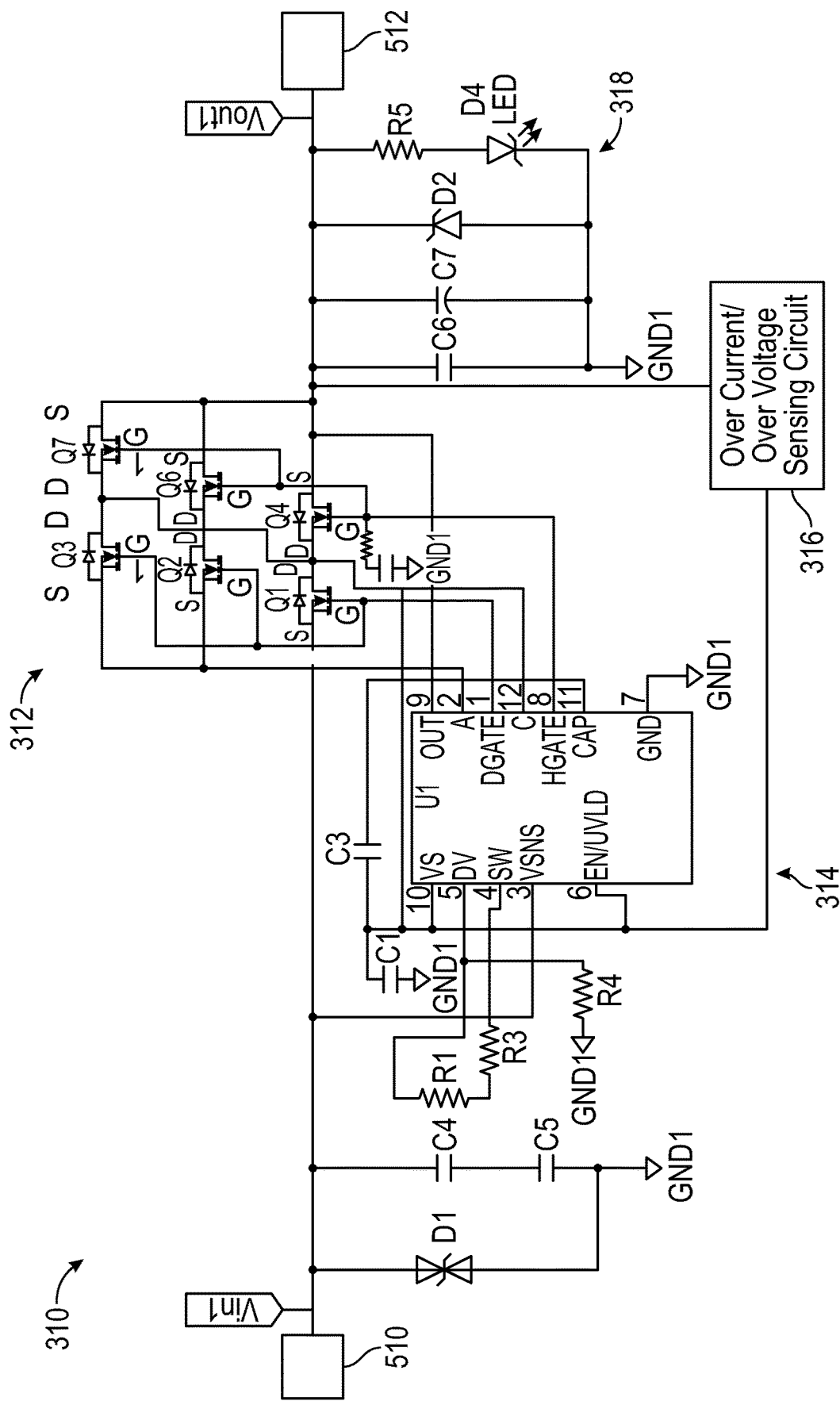
FIG. 5 is a representative circuit diagram of the switching circuit of FIG. 3.

Referring now also to FIG. 5, one example of the circuit substrate 310 and the circuits thereon is set forth. In this example, a connector 510 couples the eFuse 56 to the power converter 50. A pair of capacitors C4 and C5 in parallel with a bi-directional breakdown transient voltage suppressor D1 may be used prior to the input of the switching circuit 312.

The switching circuit 312 may comprise an ideal diode controller such as that manufactured by Texas Instruments as Model LM74800. The switching circuit control 314 controls the gates of the switching circuit 312. In this example, three switching circuits Q1, Q2, and Q3 are disposed in parallel with the common control element being the DGATE output of the switching circuit controller. That is, all the n-channel MOSFET switches Q1-Q3 are simultaneously controlled using the signal at the DGATE output. Likewise, the switches Q4-Q7 are coupled to an HGATE output that is used to simultaneously control the switches Q4-Q7. The switching circuit controller 314 also senses the drain to source voltage. Of course, the number of switches Q1-Q7 may vary depending upon the amount of current to be drawn through the circuit. Two switches Q1 and Q4 may be used in low current applications whereas six switches, Q1-Q7, may be used for higher current applications. More switches allow a greater area of the circuit to be used. Ultimately, the output connector 512 couples the circuit substrate to the bus 52. The indicator circuit 318 is a parallel combination of two transistors C6 and C7, a diode D2 and a resistor R5 in parallel with a LED D4. The overcurrent/overvoltage sensing circuit 316 is coupled to the output of the switching circuit 312. The overcurrent/overvoltage sensing circuit 316 may be a Texas Instruments TPS2492 which is a hot swap controller that protects the n-channel MOSFETs from overcurrent and overvoltage. Overcurrent and overvoltage may be monitored by the switching circuit controller 314 and the overcurrent/overvoltage sensing circuit 316 by monitoring the drain to source voltage. The drain to source voltage should be higher than the source to drain voltage. When a switching of the voltage occurs, the n-channel MOSFETs are commanded to stop conducting.

In operation, the eFuse circuits operate in different ways depending upon the conditions at the buses 52A, 52B and the state of the power converter 50, the accumulators 60A, 60B and the relays 58A, 58B. When the vehicle is at rest, the relay controller 78 controls the relays 58A, 58B to be in an opened state. That is, power from either the power converters 50 or the accumulators 60A, 60B is not communicated to either of the buses 52A, 52B. This allows the external charger 80 to charge the accumulators 60A, 60B.

When the vehicle is desired to be underway, an ignition signal is communicated from the relay controller 78 to the relays 58A, 58B after the power converter 50 is coupled to the accumulators 60A, 60B and charging is initiated. This is performed after the external charger 80 is removed from the system. Once the relays 58A, 58B are closed, power from the nodes 62A, 62B are coupled respectively to the first power bus 52A and the second power bus 52B. This is a normal operating condition.

When the power converter 50 has a fault such as an overcurrent or overvoltage condition, both eFuses 56A, 56B are opened and the accumulators 60A, 60B are coupled to their respective power the buses 52A, 52B.

When normal operation is occurring and the buses 52A, 52B are powered by the power source or power converter 50 and either an accumulator 60A, 60B or both fails, the buses 52A, 52B are powered by the power source or power converter 50.

If there is a fault or failure of the power source or power converter 50 and one of the accumulators 60A or 60B fails, either bus 52A or 52B is powered by the remaining accumulator. That is, if the power converter 50 and first accumulator 60A fails, the second accumulator 60B is coupled to the node 62B which, in turn, through the relay 58B powers the secondary bus 52B. In this mode of operation, the front right and rear left brake controllers 18 operate as well as the ECUs 14 of all four corners to allow the steering controller 16 to steer the vehicle safely to a stopping position. Most other functions such as those functions coupled to the main bus 52A will be disabled. It should be noted that the brake controllers 18 that are active in this state are opposite corners and safely allow the vehicle to come to a complete stop.

Should the power converter 50 and the accumulator 60B fail, the secondary bus 52B is not powered and the main bus 52A is powered allowing most of the vehicle functions except for the front right and the rear left brake controllers 18 to stop the vehicle. An indicator or haptic feedback may be provided to the operator of the vehicle using the central controller and the display 94.

When a fault is detected at the first power bus and all the accumulators 60A, 60B and power converter 50 are operating properly, the eFuse 56A switches to an open circuit. This prevents the DC-to-DC power source or power converter 50 from being damaged by the electrical fault. That is, an overcurrent/overvoltage or short circuit coupled to the main bus 52 will cause the eFuse 56A to open rapidly and preferably within nanoseconds. The fault is also sensed by the fault detection circuit 82 of the central controller 22 and the relay controller 78 opens the relay 58A. Relays typically open at a very slow rate, however, the power converter 50 is protected immediately by the eFuse 56A. Both the power converter 50 and the relay 58A isolate the main bus 52A from being powered by either the accumulator 60A or the power converter 50. The power converter 50 is still coupled to the second relay 58B and the secondary bus 52B through the eFuse 56B which remains closed. The second accumulator 60B stills provides backup power in case the power converter 50 fails. By powering the secondary bus 52B, the vehicle still may be braked using the brake controllers 18 at opposite corners (front, right and rear left) as mentioned above. Likewise, the ECU 14 in conjunction with the steering controller 16 allows the vehicle to be steered.

When the system is operating properly (normally or when a fault subsides) and the power converter 50 and the accumulators 60A, 60B are operating properly, the relays 58A, 58B are closed while the eFuses 56A, 56B are also conducting. When a fault is detected at the secondary bus 52B, the eFuse 56B opens nearly immediately to prevent damage to the power converter 50. The second relay 58B eventually opens under the control of the relay controller 78 as mentioned above. In this manner, the vehicle still has brakes at the front left and rear right brake controllers 18 as illustrated in FIG. 2. The ECUs 14 of all four corners allow the vehicle to steer as well. A warning light might be generated at the display 94 to notify the operator that the vehicle needs attention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle comprising:
a first power bus operating in a first voltage range;
a second power bus operating in the first voltage range;
a plurality of vehicle corner modules coupled to the first power bus and the second power bus;
a power source;
a first eFuse circuit selectively coupling the power source to the first power bus;
a second eFuse circuit selectively coupling the power source to the second power bus;
a first accumulator coupled to a first node between the first eFuse circuit and the first power bus;
a second accumulator electrically coupled to a second node between the second eFuse circuit and the second power bus;
the first eFuse circuit opens in response to a first electrical fault at the first power bus, and the second power bus powered with the power source or the first accumulator; and
the second eFuse circuit opens in response to a second electrical fault at the second power bus, and the first power bus powered with the power source or the first accumulator;
wherein the first power bus is coupled to a steering controller of each of the plurality of vehicle corner modules having a steering system and the second power bus is coupled to the steering controller of each of the plurality of vehicle corner modules having the steering system.

2. The automotive vehicle of claim 1 wherein the first eFuse circuit opens by disconnecting the power source from the first power bus and the second eFuse circuit opens by disconnecting the power source from the second power bus.

3. The automotive vehicle of claim 1 wherein the first power bus is powered by the first accumulator and the second power bus powered by the second accumulator during a failure of the power source and wherein the first eFuse circuit and the second eFuse circuit are open during the failure of the power source.

4. The automotive vehicle of claim 1 further comprising a first relay electrically coupled to the first node between the first eFuse circuit and the first power bus, and further comprising a second relay electrically coupled to the second node between the second eFuse circuit and the second power bus.

5. The automotive vehicle of claim 4 wherein the first relay opens in response to the first electrical fault at the first power bus, wherein the second relay opens in response to the second electrical fault at the second power bus.

6. The automotive vehicle of claim 5 further comprising a relay controller controlling the relay in response to a fault detection circuit.

7. The automotive vehicle of claim 6 wherein the relay controller closes the first relay or the second relay when the first electrical fault or the second electrical fault subsides.

8. The automotive vehicle of claim 1 wherein the power source comprises a DC-to-DC converter.

9. The automotive vehicle of claim 1 wherein the first accumulator comprises a first battery or a first ultracapacitor and wherein the second accumulator comprises a second battery or a second ultracapacitor.

10. The automotive vehicle of claim 1 wherein a steering controller is electrically coupled to the first power bus or the second power bus, or both.

11. The automotive vehicle of claim 1 wherein the first power bus is coupled to a first plurality of components and the second power bus is coupled to a second plurality of components, said first plurality of components greater than the second plurality of components.

12. An automotive vehicle comprising:
a first power bus operating in a first voltage range;
a second power bus operating in the first voltage range;
a power source;
a first eFuse circuit selectively coupling the power source to the first power bus;
a second eFuse circuit selectively coupling the power source to the second power bus;
a first accumulator coupled to a first node between the first eFuse circuit and the first power bus;
a second accumulator electrically coupled to a second node between the second eFuse circuit and the second power bus;
the first eFuse circuit opens in response to a first electrical fault at the first power bus, and the second power bus powered with the power source or the first accumulator; and
the second eFuse circuit opens in response to a second electrical fault at the second power bus, and the first power bus powered with the power source or the first accumulator;
wherein the first power bus is coupled to a front left brake controller and a rear right brake controller, and the second power bus is coupled to a front right brake controller and a rear left brake controller.

13. The automotive vehicle of claim 12 wherein the first eFuse circuit opens by disconnecting the power source from the first power bus and the second eFuse circuit opens by disconnecting the power source from the second power bus.

14. The automotive vehicle of claim 12 wherein the first power bus is powered by the first accumulator and the second power bus powered by the second accumulator during a failure of the power source and wherein the first eFuse circuit and the second eFuse circuit are open during the failure of the power source.

15. The automotive vehicle of claim 12 further comprising a first relay electrically coupled to the first node between the first eFuse circuit and the first power bus, and further comprising a second relay electrically coupled to the second node between the second eFuse circuit and the second power bus.

16. The automotive vehicle of claim 15 wherein the first relay opens in response to the first electrical fault at the first power bus, wherein the second relay opens in response to the second electrical fault at the second power bus.

17. The automotive vehicle of claim 16 further comprising a relay controller controlling the relay in response to a fault detection circuit.

18. The automotive vehicle of claim 17 wherein the relay controller closes the first relay or the second relay when the first electrical fault or the second electrical fault subsides.

19. The automotive vehicle of claim 12 wherein the power source comprises a DC-to-DC converter.

20. The automotive vehicle of claim 12 wherein the first accumulator comprises a first battery or a first ultracapacitor and wherein the second accumulator comprises a second battery or a second ultracapacitor.

21. The automotive vehicle of claim 12 wherein a steering controller is electrically coupled to the first power bus or the second power bus, or both.

22. The automotive vehicle of claim 12 wherein the first power bus is coupled to a first plurality of components and the second power bus is coupled to a second plurality of components, said first plurality of components greater than the second plurality of components.

23. A method of distributing electrical power using power buses comprising:
operating a first power bus in a first voltage range;
operating a second power bus in the first voltage range;
electrically coupling the first power bus to a front left brake controller and a rear right brake controller and electrically coupling the second power bus to a front right brake controller and a rear left brake controller;
selectively coupling a power source to the first power bus through a first eFuse circuit;
selectively coupling the power source to the second power bus through a second eFuse circuit;
electrically coupling a first accumulator to a first node between the first eFuse circuit and the first power bus;
electrically coupling a second accumulator to a second node between the second eFuse circuit and the second power bus;
opening the first eFuse circuit in response to a first electrical fault at the first power bus, and powering the second power bus with the power source or the first accumulator; and
opening the second eFuse circuit in response to a second electrical fault at the second power bus and powering the first power bus with the power source or the first accumulator.

24. The method of claim 23 wherein opening the first eFuse circuit comprises disconnecting the power source from the first power bus and wherein opening the second eFuse circuit comprises disconnecting the power source from the second power bus.

25. The method of claim 23 further comprising powering the first power bus by the first accumulator and powering the second power bus by the second accumulator during a failure of the power source and opening the first eFuse circuit and the second eFuse circuit during the failure of the power source.

26. The method of claim 23 further comprising electrically coupling a first relay to the first node between the first eFuse circuit and the first power bus, and further comprising electrically coupling a second relay to the second node between the second eFuse circuit and the second power bus.

27. The method of claim 26 further comprising opening the first relay in response to the first electrical fault at the first power bus and opening the second relay in response to the second electrical fault at the second power bus.

28. The method of claim 26 further comprising controlling the first relay in response to a fault detection circuit with a relay controller.

29. The method of claim 28 further comprising closing the first relay or the second relay when the first electrical fault or the second electrical fault subsides using the relay controller.

30. The method of claim 23 wherein the power source comprises a DC-to-DC converter, the first accumulator comprises a first battery or a first ultracapacitor and wherein the second accumulator comprises a second battery or a second ultracapacitor.

31. The method of claim 23 further comprising electrically coupling a steering controller to the first power bus.

32. The method of claim 23 further comprising coupling the first power bus to a first plurality of components and coupling the second power bus to a second plurality of components, said first plurality of components greater than the second plurality of components.

33. A method of distributing electrical power using power buses comprising:
operating a first power bus in a first voltage range;
operating a second power bus in the first voltage range;
coupling a plurality of vehicle corner modules to the first power bus and the second power bus by coupling the first power bus to a steering controller of each of the plurality of vehicle corner modules having a steering system and coupling the second power bus to the steering controller of each of the plurality of vehicle corner modules having the steering system;
selectively coupling a power source to the first power bus through a first eFuse circuit;
selectively coupling the power source to the second power bus through a second eFuse circuit;
electrically coupling a first accumulator to a first node between the first eFuse circuit and the first power bus;
electrically coupling a second accumulator to a second node between the second eFuse circuit and the second power bus;
opening the first eFuse circuit in response to a first electrical fault at the first power bus, and powering the second power bus with the power source or the first accumulator;
opening the second eFuse circuit in response to a second electrical fault at the second power bus and powering the first power bus with the power source or the first accumulator.

34. The method of claim 33 wherein opening the first eFuse circuit comprises disconnecting the power source from the first power bus and wherein opening the second eFuse circuit comprises disconnecting the power source from the second power bus.

35. The method of claim 33 further comprising powering the first power bus by the first accumulator and powering the second power bus by the second accumulator during a failure of the power source and opening the first eFuse circuit and the second eFuse circuit during the failure of the power source.

36. The method of claim 33 further comprising electrically coupling a first relay to the first node between the first eFuse circuit and the first power bus, and further comprising electrically coupling a second relay to the second node between the second eFuse circuit and the second power bus.

37. The method of claim 36 further comprising opening the first relay in response to the first electrical fault at the first power bus and opening the second relay in response to the second electrical fault at the second power bus.

38. The method of claim 36 further comprising controlling the first relay in response to a fault detection circuit with a relay controller.

39. The method of claim 38 further comprising closing the first relay or the second relay when the first electrical fault or the second electrical fault subsides using the relay controller.

40. The method of claim 33 wherein the power source comprises a DC-to-DC converter, the first accumulator comprises a first battery or a first ultracapacitor and wherein the second accumulator comprises a second battery or a second ultracapacitor.

41. The method of claim 33 further comprising electrically coupling a steering controller to the first power bus.

42. The method of claim 33 further comprising coupling the first power bus to a first plurality of components and coupling the second power bus to a second plurality of components, said first plurality of components greater than the second plurality of components.

* * * * *